UNITED STATES PATENT OFFICE.

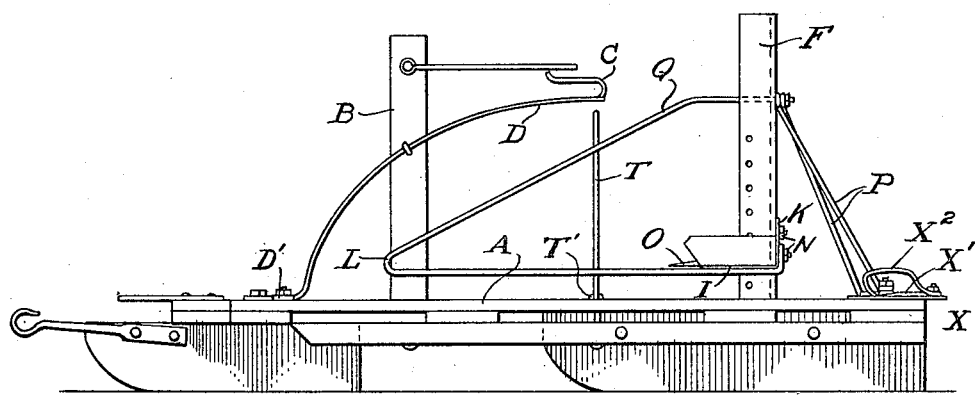
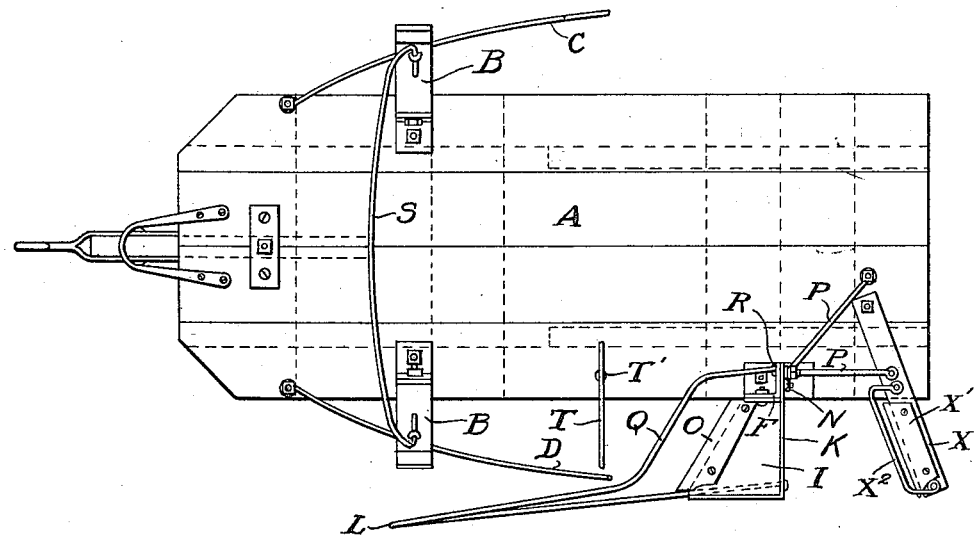

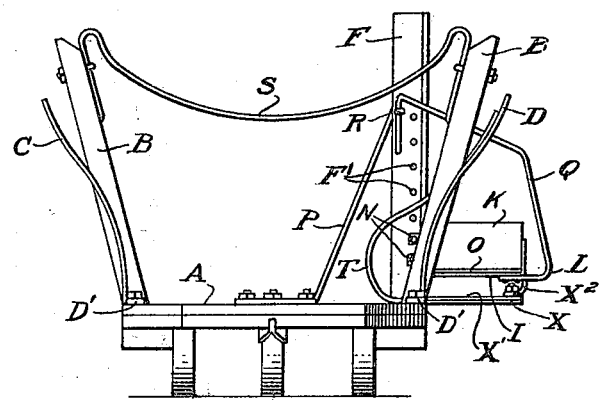
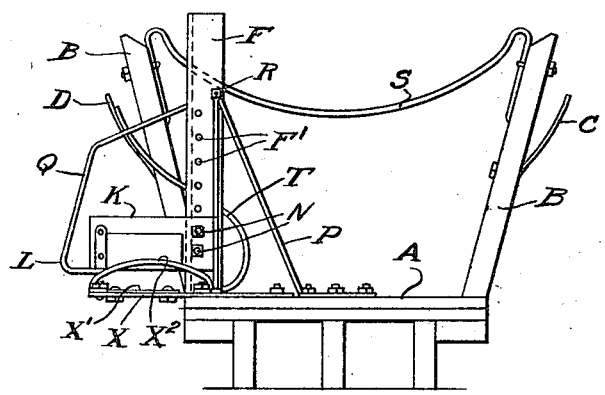

JOHN ALBERT GAUGH, OF ST. CLAIR, MISSOURI.

CORN-HARVESTER.

1,318,272.   Specification of Letters Patent.   Patented Oct. 7, 1919.

Application filed April 17, 1919. Serial No. 290,886.

*To all whom it may concern:*

Be it known that I, JOHN A. GAUGH, a citizen of the United States, residing at St. Clair, in the county of Franklin and State of Missouri, have invented certain new and useful Improvements in Corn-Harvesters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in corn harvesters and consists essentially in means for adjusting the cutter to sever the stalks at different elevations and afterward cutting the stalks at a uniform height.

The invention comprises a simple and efficient device of this nature having various details of construction, combination and arrangement of parts which will be hereinafter fully described, shown in the accompanying drawings and then specifically defined in the appended claim.

I illustrate my invention in the accompanying drawings which, with the letters of reference marked thereon, form a part of this application, and in which:

Figure 1 is a side elevation, Fig. 2 is a top plan view, Fig. 3 is a front view, and Fig. 4 is a rear view.

Reference now being had to the details of the drawings by letter:

A designates a platform mounted upon suitable runners and to which platform a team of horses or other power is adapted to be applied. Rising from the platform are standards B opposite each other, and C and D are rods which have eyes D at their forward ends bolted at the platform near the opposite edges thereof and each rod is fastened by an eye bolt to the standard B as shown. Said rods serve as means against which stalks of corn may be leaned. The upright standard F is provided with a flange which is bolted to the platform near one edge and is of angle iron with a series of perforations F' in the walls thereof. A plate H has flanges I and K, which latter are apertured to receive bolts N which pass through the same and through the apertures in said angle iron standard and provided for the purpose of adjusting said plate to different elevations. Upon the forward edge of the platform the cutting knife O is fastened by screws or other suitable fastening means, being so disposed as to offer a draw cut to the stalks of corn. The inner edge of the cutting knife is practically flush with the edge of the platform. A rod, designated by letter Q, is fastened to the outer edge of said plate and extends forward parallel to the platform and spaced apart therefrom, and at the point L is bent at an inclination as shown, and thence curved inwardly toward the platform, then rearwardly and passes through an aperture R in the angle iron standard. A nut is fitted upon the threaded end which passes through said standard, and the rod Q serves as a means for deflecting the stalks of corn toward the cutting plate. As the harvester moves forward the stalks are deflected against said rod by the outwardly and rearwardly curved rod D. A rod T has an eye T' at one end and is fastened by a bolt to the bottom of the platform and is upwardly and outwardly curved, as shown, and tends to guide the stalks as they are cut by the knife, causing the same to fall diagonally cross-wise the platform.

The two standards B have a connecting rod S bent bow shaped and fastened to the standards by eye bolts and affording means whereby the stalks of corn, when shocked, may rest.

At the extreme end of the platform at the left hand corner a bar X projects at an inclination and carries a plate X' over which a guard member $X^2$ is positioned, the ends of which are fastened to the plate carrying the blade and which latter is provided for the purpose of trimming off the stalks at a uniform height after the upper portion of the stalks have been cut to be shocked. Said angle iron standard is reinforced and braced by the rods P, the upper ends of which have eyes engaging the end of the rod Q and their lower ends receive bolts passing through the platform.

In operation, the apparatus is drawn over the field of corn and the rows of stalks are intended to be guided into the space between the bar Q and the adjacent side of the platform. When they come against the blade supported by the angle iron standard, they are severed, and fall diagonally against the platform and may then be packed up and bound and supported in the manner shown in shocks and carried to any suitable place for unloading. It will be noted that said plate carrying the cutting blade is adjustable adapting the apparatus to cut stalks of different heights.

What I claim to be new is:

A corn harvester, consisting of a platform having a vertically disposed angled apertured standard with a right angled flange at the bottom secured to said platform, a plate having flanges upon two edges and its forward edge inclined, and an inclined cutting knife fastened to the inclined edge of said plate, bolts passing through apertures in the flange of said plate and affording means for holding said plate in different adjusted positions upon the standard, a rod bent upon itself and provided with an inclined stalk deflecting portion bent toward the platform and parallel to and spaced apart and above the inclined edge of the knife, said rod having a horizontally disposed portion adapted to extend through the aperture in the standard, inclined brace rods fastened at their upper ends to the projecting end of said rod and secured at their lower ends to the rear portion of the platform.

In testimony whereof I hereunto affix my signature in presence of two witnesses.

JOHN ALBERT GAUGH.

Witnesses:
E. H. PANHORST,
M. W. STAHLMAN.

Copies of this patent may be obtained for five cents each, by addressing the "Commissioner of Patents, Washington, D. C."